US012689267B2

(12) United States Patent　　　　(10) Patent No.:　US 12,689,267 B2
Anderson et al.　　　　　　　　　　(45) Date of Patent:　　Jul. 21, 2026

(54) PASSIVE DEVICE MONITOR

(71) Applicant: Tolomatic, Inc., Hamel, MN (US)

(72) Inventors: Tyler Anderson, East Bethel, MN
(US); Steven Besser, Rockford, MN
(US); Luke Keranen, Orono, MN
(US); Bradley D. Schulz, Minneapolis,
MN (US); Ryan Bourgoine, Buffalo,
MN (US)

(73) Assignee: Tolomatic, Inc., Hamel, MN (US)

( * ) Notice: Subject to any disclaimer, the term of this
patent is extended or adjusted under 35
U.S.C. 154(b) by 513 days.

(21) Appl. No.: 18/210,803

(22) Filed: Jun. 16, 2023

(65) Prior Publication Data

US 2023/0412050 A1　　Dec. 21, 2023

Related U.S. Application Data

(60) Provisional application No. 63/352,870, filed on Jun.
16, 2022.

(51) Int. Cl.
　H02K 11/215　　　(2016.01)
　H02K 3/28　　　(2006.01)
(52) U.S. Cl.
　CPC .............. H02K 11/215 (2016.01); H02K 3/28
　　　　　　　　　　　　　　　　(2013.01)
(58) Field of Classification Search
　CPC ............ H02K 11/215; H02K 3/28; H02P 6/16
　See application file for complete search history.

(56) References Cited

U.S. PATENT DOCUMENTS 4,525,763 A　　6/1985　Hardy et al.
5,945,011 A　　8/1999　Takano et al.

6,041,287 A　　3/2000　Dister et al.
6,055,461 A　　4/2000　Sumiyama et al.
6,274,840 B1　　8/2001　Kanjo
6,313,427 B1　11/2001　Suita
6,531,674 B2　　3/2003　Suita (Continued)

FOREIGN PATENT DOCUMENTS

CN　　　　1782444 A　　6/2006
CN　　100370387 C　　2/2008

(Continued)

OTHER PUBLICATIONS

Communication pursuant to Article 94(3) EPC dated Dec. 16, 2025
in connection with European patent application No. 23179476.9, 6
pages.

(Continued)

*Primary Examiner* — Mohamad A Musleh

(74) *Attorney, Agent, or Firm* — Dorsey & Whitney LLP

(57)　　　　　　　　ABSTRACT

A motor system includes a motor having a rotor with a
plurality of magnetic poles disposed adjacent a plurality of
stator elements. Motion of the rotor is responsive to a change
in magnetic flux from the stator elements. A generator
comprising one or more coils and/or pickups is configured to
generate electromagnetic signals responsive to the motion of
the rotor, the change in flux from the stator elements, or
both. A controller is configured to generate power from the
signals, for operating a processor with memory. The pro-
cessor and memory are configured to receive the signals,
determine a count of cycles and/or direction changes of the
motor based on the signals, and store the count in the
memory.

14 Claims, 10 Drawing Sheets

(56) References Cited

U.S. PATENT DOCUMENTS

| | | | |
|---|---|---|---|
| 6,828,522 B2 | 12/2004 | Hochhalter et al. | |
| 6,834,256 B2 | 12/2004 | House et al. | |
| 6,888,089 B2 | 5/2005 | Okanda et al. | |
| 7,002,095 B2 | 2/2006 | Kato et al. | |
| 7,039,474 B2 | 5/2006 | Bonnain et al. | |
| 7,124,057 B2 | 10/2006 | Foerster et al. | |
| 7,254,514 B2 | 8/2007 | House et al. | |
| 7,283,934 B2 * | 10/2007 | Deller | G05B 19/4063 |
| | | | 702/183 |
| 7,301,117 B2 | 11/2007 | Wiedemann et al. | |
| 7,412,323 B2 | 8/2008 | Tanaka et al. | |
| 7,574,324 B2 | 8/2009 | Ueno | |
| 7,801,701 B2 | 9/2010 | Mayer | |
| 8,121,818 B2 | 2/2012 | Gorinevsky | |
| 8,504,307 B2 | 8/2013 | Norihisa | |
| 8,594,852 B2 | 11/2013 | Alstrin et al. | |
| 8,838,413 B2 | 9/2014 | Genta | |
| 9,020,642 B2 | 4/2015 | Inazumi | |
| 9,457,438 B2 | 10/2016 | Abdallah et al. | |
| 9,463,573 B2 | 10/2016 | Inazumi | |
| 10,907,722 B2 | 2/2021 | Besser et al. | |
| 2004/0074877 A1 | 4/2004 | Hochhalter et al. | |
| 2004/0162704 A1 | 8/2004 | Siegel et al. | |
| 2004/0249520 A1 | 12/2004 | Maine | |
| 2005/0043923 A1 | 2/2005 | Forster et al. | |
| 2005/0255186 A1 | 11/2005 | Hiraga | |
| 2006/0036402 A1 | 2/2006 | Deller et al. | |
| 2006/0060078 A1 | 3/2006 | Deller et al. | |
| 2006/0113940 A1 | 6/2006 | Nagai et al. | |
| 2006/0171625 A1 | 8/2006 | Jones et al. | |
| 2006/0259271 A1 | 11/2006 | House et al. | |
| 2008/0065354 A1 | 3/2008 | Yoshioka et al. | |
| 2009/0171594 A1 | 7/2009 | Norihisa | |
| 2011/0015788 A1 * | 1/2011 | Celik | H02P 6/16 |
| | | | 700/275 |
| 2012/0290261 A1 | 11/2012 | Genta | |
| 2013/0013138 A1 | 1/2013 | Lu et al. | |
| 2014/0339943 A1 | 11/2014 | Peczalski et al. | |
| 2015/0295468 A1 | 10/2015 | Pizzoni et al. | |
| 2016/0116304 A1 | 4/2016 | Iwamoto et al. | |
| 2016/0132050 A1 | 5/2016 | Heller et al. | |
| 2016/0144508 A1 | 5/2016 | Nakajima | |
| 2016/0311111 A1 | 10/2016 | Ogawara | |

| | | | |
|---|---|---|---|
| 2017/0069145 A1 | 3/2017 | Dorkel et al. | |
| 2019/0048988 A1 | 2/2019 | Besser et al. | |
| 2019/0107824 A1 | 4/2019 | Oohara | |

FOREIGN PATENT DOCUMENTS

| | | | |
|---|---|---|---|
| CN | 101943911 A | 1/2011 | |
| CN | 101965140 A | 2/2011 | |
| CN | 103331310 A | 10/2013 | |
| CN | 104626168 A | 5/2015 | |
| CN | 105252539 A | 1/2016 | |
| DE | 102010050837 A1 | 5/2012 | |
| EP | 1595681 A1 | 11/2005 | |
| EP | 2776211 B1 | 6/2016 | |
| JP | 2000141262 A | 5/2000 | |
| JP | 2005201390 A | 7/2005 | |
| JP | 2011042022 A | 3/2011 | |
| JP | 2014006566 A | 1/2014 | |
| JP | 2015143969 A | 8/2015 | |
| KR | 20190038822 A | 4/2019 | |
| WO | 2008065354 A1 | 6/2008 | |
| WO | WO-2011128687 A2 * | 10/2011 | H02P 6/14 |
| WO | 2018028739 A1 | 2/2018 | |
| WO | 2019133780 A1 | 7/2019 | |

OTHER PUBLICATIONS

International Search Report and Written Opinion dated Jan. 3, 2017 in connection with International Patent Application No. PCT/US2016/051647, 9 pages.

Office Action dated Sep. 2, 2020 in connection with Chinese patent application No. 2016800530630, 19 pages including English translation.

Examination Report dated Sep. 15, 2020 in connection with European patent application No. 16770427.9, 6 pages.

Extended European Search Report dated Oct. 26, 2023 in connection with European patent application No. 23179476.9, 8 pages.

English translation of Schaeffler Technologies AG Korean patent publication No. KR20190038822A, which published Apr. 9, 2019.

First Office Action dated Apr. 8, 2026 in connection with Mexican patent application No. MX/a/2023/007077, 16 pages including English translation.

* cited by examiner

200

110

Generator
140

210
Signal Generation

170

Electronics
155

153

Rectifier
220

OptoCouplers
240

158

159

230
Device Power

250
Control Signal

156

150

152

Data Processing
260

154

Non-Volatile Memory
270

157

Communication
280

PASSIVE DEVICE MONITOR

CROSS-REFERENCE TO RELATED APPLICATION

This application claims priority to U.S. Provisional Patent Application Ser. No. 63/352,870, filed Jun. 16, 2022, and entitled "Passive Device Monitor," which is incorporated by reference herein, in the entirety and for all purposes.

FIELD

The present disclosure relates to electrically powered linear actuators and more generally to electrically powered actuator systems adapted for a variety of automated machine tool and robotic applications. These applications include, but are not limited to, actuators for robotic, pedestal, and fixture welding guns, welding guns utilized in the automotive industry and other industrial technologies, injection molding, short stroke actuator systems, actuation of clamping fixtures, pressing applications, and other accurate linear movement and positioning technologies.

BACKGROUND

A wide range of linear and rotary actuator designs can be used to control the movement and operation of automated machine tools and other robotic devices. Applications include clamping fixtures, welding guns, soldering equipment, cutting and machining tools, sprayers, casting and molding fixtures, and other automated machines for manufacturing, transportation, electronics, packaging, food processing, and coating industries.

While hydraulic and pneumatic actuator technologies have been successfully used across these different technologies, electric motor-driven systems have been increasingly adopted, reducing the risk of seal failure, leakage, and other limitations of fluid-based actuator systems, reducing size and weight, and eliminating the need for compressed air feeds and other auxiliary (e.g., hydraulic) systems. Electric motor actuators can also provide increased positioning accuracy, while maintaining design requirement for speed, torque, power and fixture loading.

Electric motor actuators include both externally mounted and hollow rotor, integrated motor designs. A screw and nut assembly can be used to convert the rotational motion of the motor into linear displacement of the positioning element, for example a thrust tube or output rod coupled to a machine tool fixture. Alternatively, a belt or chain drive can be used. These systems provide reliable and accurate positioning solutions across the full range of industrial applications, including high-speed and highly-loaded applications, with torque and power output adapted accordingly.

Across these applications, there remains a need for improved actuator system monitoring, including accurate, independent determination of the number of motor cycles, as well as the motor and actuator travel distance. These needs extend beyond traditional approaches to the problem, not limited by prior art encoder and resolver system designs.

SUMMARY

A passive motor cycle sensor system is provided for linear actuators and other motor and actuator systems. In motor system applications, a rotor is typically provided with a plurality of magnetic poles disposed adjacent a plurality of stator elements, for example stator windings or stator teeth.

The rotor can be driven into motion in response to changes in the magnetic flux generated by the stator elements.

A generator is provided with a number of coils or similar pickup devices configured to generate electromagnetic signals in response to the motion of the rotor, or the change in flux from the stator elements, or both. A controller is configured to generate power from the signals, in order to operate electronics including a processor and memory. The processor is configured to determine a count of cycles and/or direction changes of the motor based on the signals, and to store the count in memory. The count can be communicated to an external computing device, for example using a wireless interface.

The controller can be connected to the generator via signal or data bus wires, and mounted to the outside of the actuator housing, for example in a pocket or recess, with a cover transparent to RF (radio frequency) signals. Because the generator functions based on motor operation, no other external power source is required for the controller. Applications include, but are not limited to, linear and rotary motor actuators, screw-driven linear actuators, belt-driven actuators, and linear motor actuators.

Example motor systems are described herein. An example motor system may include a motor having a rotor with a plurality of magnetic poles disposed adjacent a plurality of stator elements. Motion of the rotor may be responsive to a change in magnetic flux from the plurality of stator elements. The example motor system may further include a generator comprising a coil configured to generate an electromagnetic signal responsive to the motion of the rotor, the change in magnetic flux from the plurality of stator elements, or both, and a controller configured to generate power from the electromagnetic signal to operate a processor configured to determine a count of cycles and/or direction changes of the motor based on the electromagnetic signal, and store the count in memory. Additionally or alternatively, the controller includes a rectifier and regulator collectively configured to convert a portion of the electromagnetic signal to a voltage of the power to operate the processor, and to regulate the voltage to operate the processor. Additionally or alternatively, the controller includes an energy storage system configured to store the power to operate the processor, absent the electromagnetic signals from the coil. Additionally or alternatively, the controller includes an optical coupler, isolator, or receiver configured to receive the electromagnetic signal from the coil, in parallel with the rectifier and the regulator. Additionally or alternatively, the controller comprises a signal encoder or decoder coupled to the optical coupler, isolator, or receiver, and/or the electromagnetic signal from the coil is provided to the signal encoder or decoder as digital pulse sequences or square waves having at least two different phases, generated based on placement of the coil. Additionally or alternatively, the processor is configured to determine the direction changes of the motor based on a shift in the at least two different phases, and to determine the count of cycles based on the direction changes. Additionally or alternatively, the electromagnetic signal from the coil is encoded as a quadrature signal at the signal encoder, and the processor is configured to determine the direction changes from the quadrature signal, and to determine the count of cycles based on the direction changes. Additionally or alternatively, the controller includes a serial input/output interface or wireless data interface configured to communicate the count of cycles and/or direction changes to a mobile computing device or hub computer.

Example methods are described herein. An example method includes generating, via a generator of a motor system, an electromagnetic signal responsive to the motion of a rotor of a motor of the motor system, the change in flux from a plurality of stator elements of the motor, or both. The rotor may include a plurality of magnetic poles disposed adjacent the plurality of stator elements. The example method may further include generating power for operating a processor of a controller of the motor system from the electromagnetic signal, and determining a count of cycles and/or direction changes of the motor based on the electromagnetic signal. Additionally or alternatively, the example method further includes storing the count of cycles and/or direction changes in the memory. Additionally or alternatively, the example method further includes communicating the count of cycles and/or direction changes to a mobile computing device or hub, via a serial input/output interface or a wireless data interface. Additionally or alternatively, the example method further includes converting, via a rectifier and regulator of the controller, a portion of the electromagnetic signal to a voltage of the power to operate the processor, and to regulate the voltage to operate the processor. Additionally or alternatively, the example method further includes storing, via an energy storage system, the power to operate the processor, absent the electromagnetic signals from the coil. Additionally or alternatively, the example method further includes receiving, via an optical coupler, isolator, or receiver, the electromagnetic signal from the coil, in parallel with the rectifier and the regulator.

Example actuator systems are described herein. An example actuator system includes a housing disposed about a plurality of stator elements and a rotor having a plurality of magnetic poles disposed adjacent the plurality of stator elements. The rotor may be configured for rotation about an axis responsive to a change in magnetic flux generated thereby. The example actuator system further includes a screw and nut assembly coupled to the rotor. The screw and nut assembly may be configured to convert the rotation of the rotor to linear motion of an output rod or output rod. The example actuator system may further include a plurality of coils and/or pickups configured to generate electromagnetic signals responsive to the rotation of the rotor, the change in flux generated by the plurality of stator elements, or both, and a controller configured to generate power from the electromagnetic signals for operating a processor with memory configured to receive the electromagnetic signals, determine a count of cycles and/or direction changes of the motor based thereon, and store the count in the memory. Additionally or alternatively, the controller is coupled to an exterior of the housing or disposed within a recess therein, and connected to the plurality of coils and/or pickups via signal wires or a signal bus. Additionally or alternatively, the actuator system further includes a cover disposed over the controller, wherein the cover is formed of an RF (radio-frequency) transparent material configured for wireless communication with the processor. Additionally or alternatively, the plurality of coils and/or pickups are mounted on an inside of the housing adjacent the rotor, and configured to generate the electromagnetic signals from the plurality of magnetic poles, responsive to the rotation of the rotor. Additionally or alternatively, the actuator system further includes a set of individual or discrete permanent magnets disposed about an end of the rotor with alternating polarity. The plurality of coils and/or the pickups may be configured to generate the electromagnetic signals upon the rotation of the rotor, responsive to the alternating polarity. Additionally or alternatively, the plurality of stator elements comprise stator windings and the coils and/or the pickups are disposed proximate end turns of the stator windings, or inductively coupled to a motor current supply for the stator windings.

DETAILED DESCRIPTION

Figure 1:
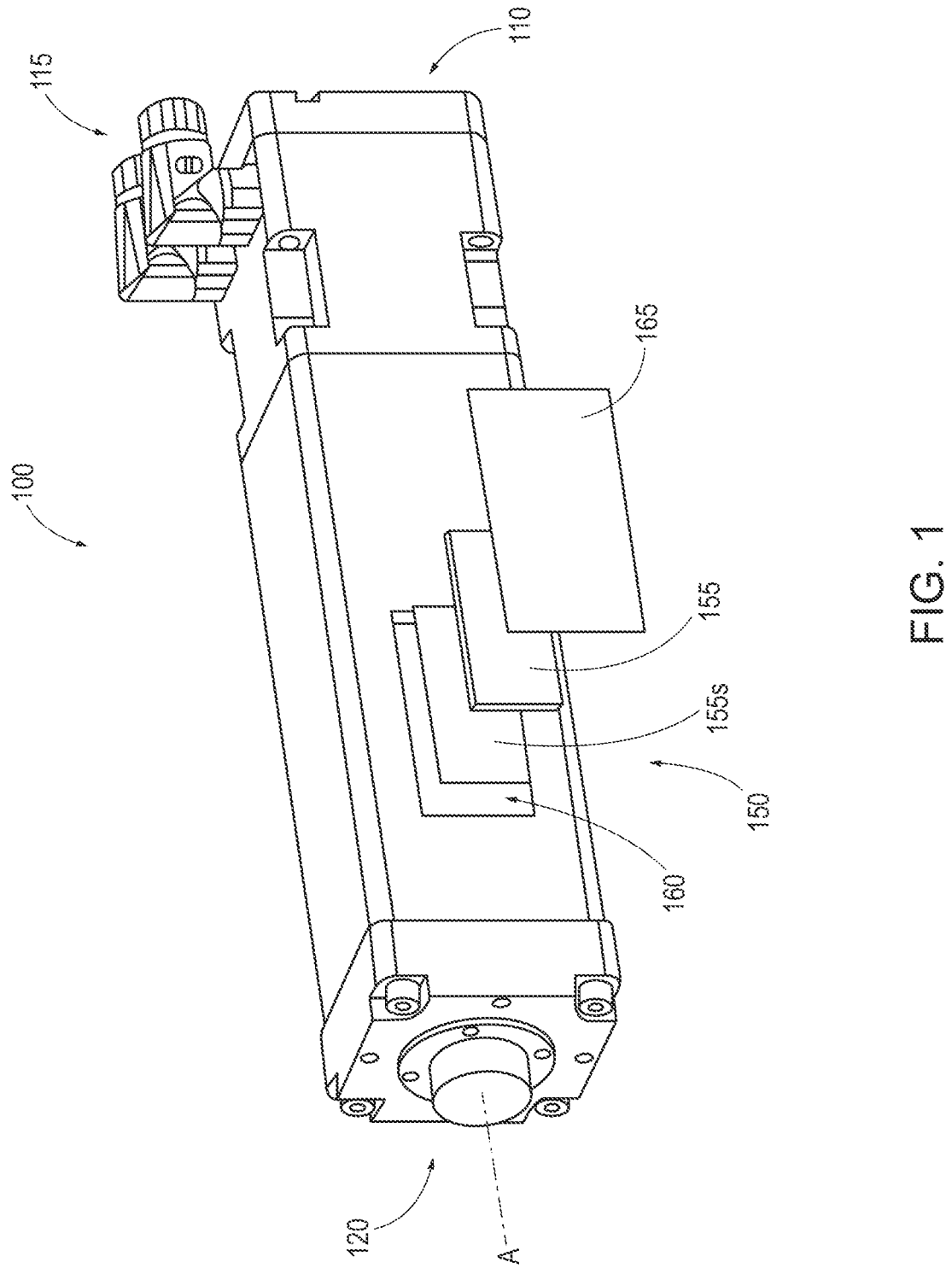
FIG. 1 is an isometric view of an integrated motor actuator system with an internal generator system connected to a microcontroller disposed in the actuator housing.

The present disclosure relates to a device that can be used to determine the number of cycles a linear actuator or motor has traveled, as well as travel distance and other useful metrics. In one example, the device includes two components. The first component is a microcontroller system with a computer processor and memory that computes and stores position and cycle data based on voltage or current signal, and the other component is a generator that produces the signals; e.g., as a series of voltage or current pulses. The microcontroller includes a communication interface for wired or wireless communication. The generator provides voltage pulses which can be used both to power the microcontroller, and to provide data for determining the number of motor cycles, as well as the rotor direction, and the distance and direction of actuator travel.

In some applications, the microcontroller and communication interface electronics operate in a passive manner; e.g., without external power requirements. These include, both safety-critical and operational applications where positional determinations may be desired without access to line voltage, or other external power supply, whether due to power failure or to provide an independent, passive position sensing system. The voltage pulses created by the generator can also perform the action of "waking up" (initiating) the microcontroller electronics, providing sustained electrical power and providing signals for cycle counting, direction, and travel distance/position determination.

While counting pulses, the microcontroller can compute and store the "direction state" as well as total revolutions; e.g., in non-volatile memory. When the actuator stops moving, the voltage of the pulses drops and the controller can be shut off or operated in a low-power mode, in which the cycle, direction and position data are saved in memory, and available to be accessed when the motor starts up again, or when queried via the interface.

These data can be accessed externally, by different modes of communication. The communication mode can be direct wired, for example using a universal serial bus (USB) or other wired serial (or parallel) data connection. The communication mode can also be wireless, for example using an RF (radio-frequency) near-field communication (NFC), or a low energy (LE), low-power, long range (LoRa) wireless system, including, but not limited to, industry standards such as Bluetooth, low-energy Bluetooth (Bluetooth LE), a long-range wide area network (LoRaWAN), a Zigbee (low power wireless) system, a Z-Wave (low-energy mesh network) system, or a low-power internet protocol (IP) adapted for IP version 6 (IPv6), or other IP versions provided over a low-power wireless personal or wide-area network (e.g., 6LoWPAN).

System Operation

The signals of a small generator internal to or couple to the actuator can be used for both power generation, to power a small microprocessor controller and memory chip, as well as providing signals for the controller to process for counting motor cycles, and other analytics. Voltage signals from a multi-phase generator, passed through a receiver such as an optical isolator (or optical coupler; also "opto-isolator" or "opto-coupler"), are very much the same as or substantially similar to a quadrature signal. The processor can convert a series of such quadrature signals (or quadrature-like signals) into a useful count of motor revolutions or cycles. The same signals from the multi-phase generator can also be passed through a rectifier to produce a voltage suitable to power the microprocessor controller electronics, which are configured to perform the cycle counting.

These techniques can be adapted to reduce, minimize or eliminate the need for external circuit power, at low production cost and with straightforward installation, depending on design requirements. Once the processor, memory and power generator are suitable configured and disposed in an appropriate placement, within the actuator system, the analytical ability can be scaled up from counting the number of motor or rotor cycles to include additional data in the form of temperature, load, moisture (or humidity), vibrational signatures, and other analytical date; e.g., in the form of histograms and other suitable analytics.

These technique can also provide as a way to track the work done on an actuator system; e.g. as described in U.S. Publication No. 2019/0048988 A1, which is incorporated by reference herein, in the entirety and for all purposes. They can also be added to existing actuator products and systems, without substantially expanding the weight and size envelope, at relatively low cost.

These features distinguish from existing "smart" encoder and microcontroller designs, and other systems that rely on an external power source. The generator itself could be provided either in the form of a small (e.g., three-phase) motor, or in a customized design engineered for integration into an existing motor system. The generator could also, for example, be provided in the form of one or more coils or other electromagnetic pickups, placed on, adjacent to, or near the existing stator teeth of a hollow core generator mounted around the rotor.

Figure 2A:
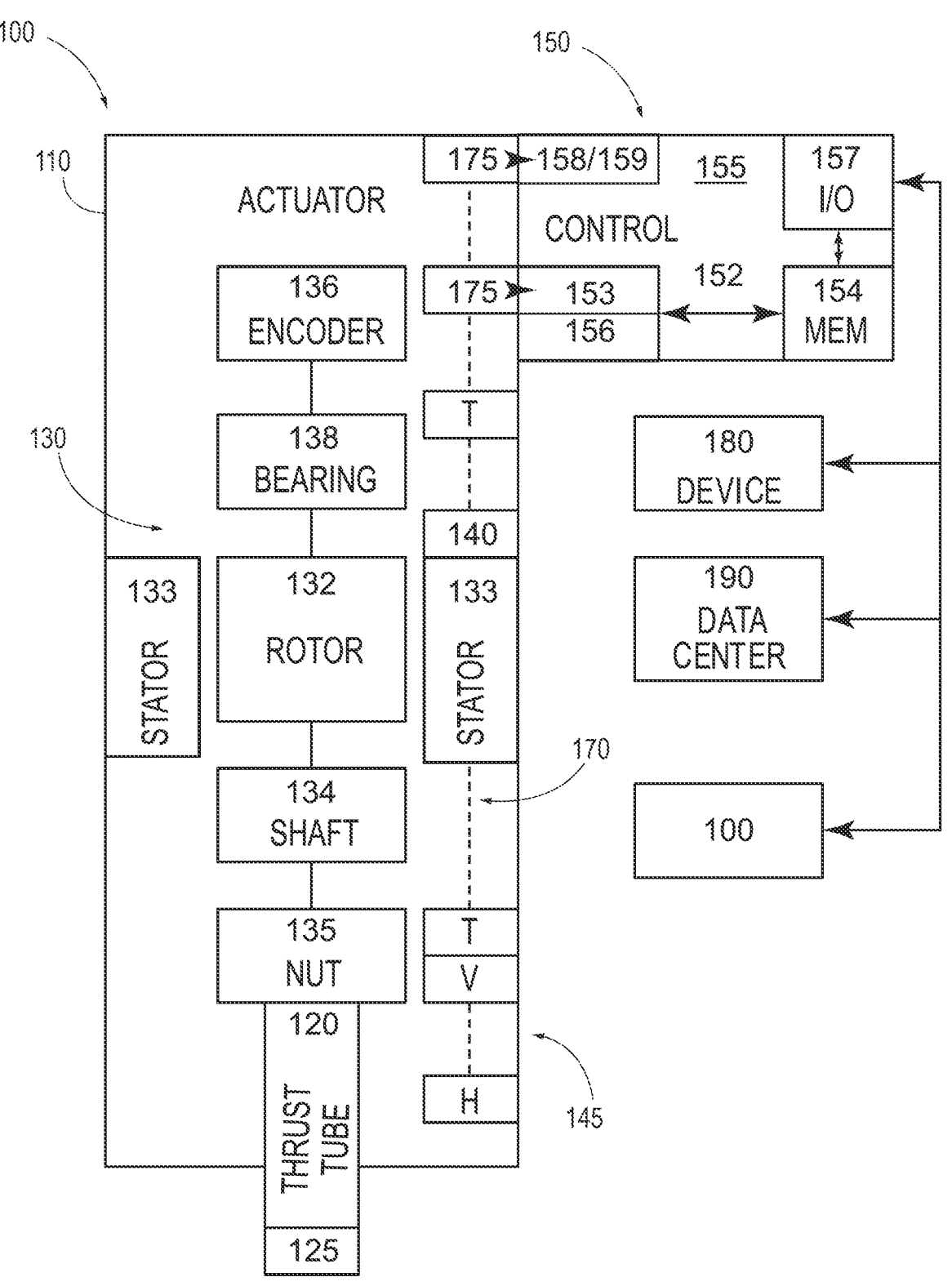
FIG. 2A is a block diagram of the motor actuator system, illustrating the generator system and microcontroller.
Figure 2B:
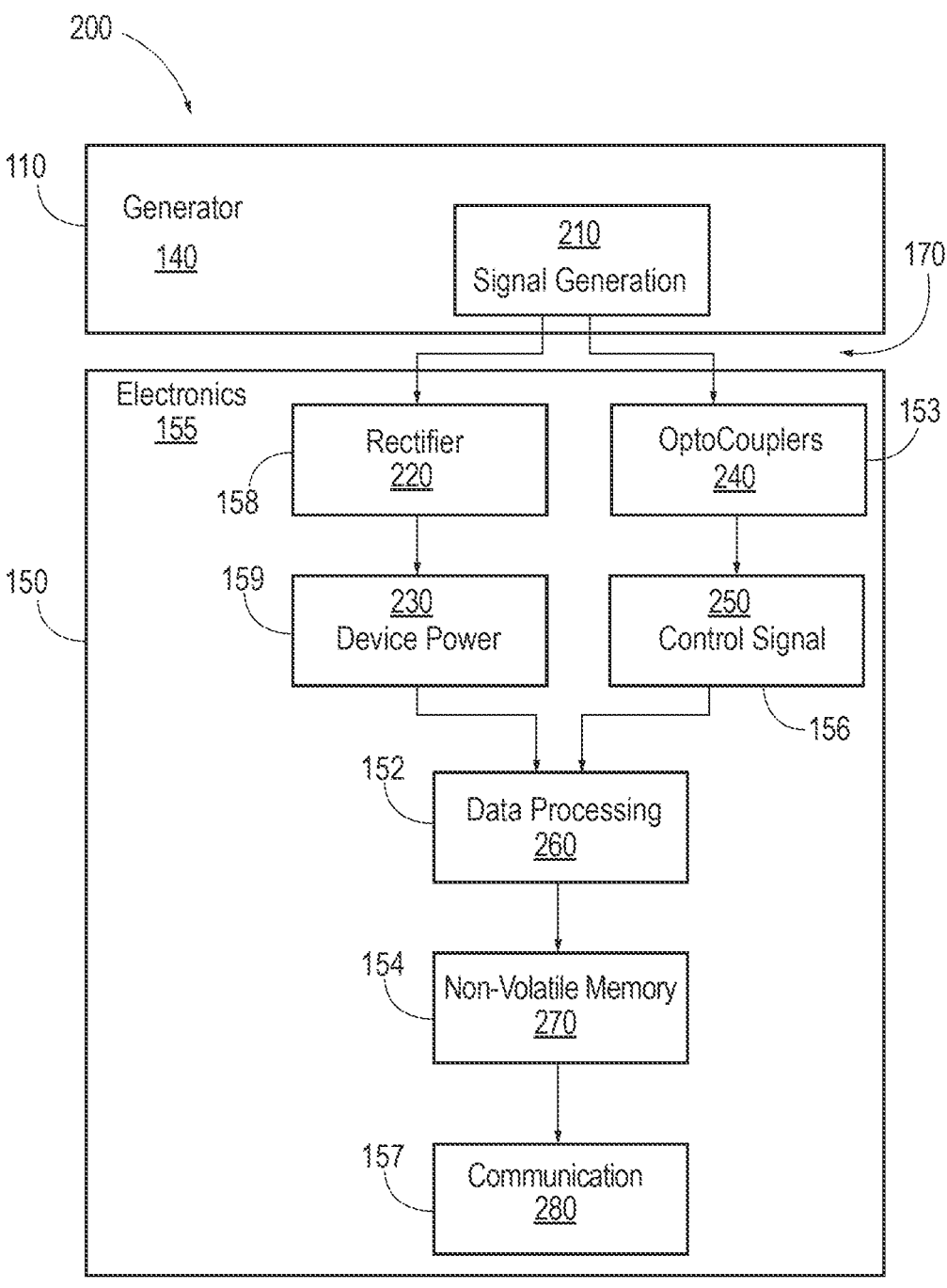
FIG. 2B is a process flow chart illustrating conversion of signals from the generator system into power for the microcontroller, and into motor cycle and positional data.

FIG. 1 is an isometric view of an integrated motor actuator system (or actuator) 100 with housing 110, data and power connectors 115, and a thrust tube or output rod 120 adapted for linear motion along the actuator axis A. FIG. 2A is a block diagram of the actuator system 100 in FIG. 1, and FIG. 2B is a is a process flow chart 200 illustrating conversion of signals S from the power generator system 140 into power for the microcontroller (or controller) 150, and into motor cycle count and positional data for storage in memory 154.

As shown in FIG. 2A, output rod 120 can be coupled to a machine tool fixture or end effector 125, and adapted to translate along actuator axis A in response to the rotational motion of integrated motor assembly 130. Motor assembly (or motor) 130 includes a rotor 132 disposed within a hollow stator assembly (or stator) 133, and coupled to a screw shaft 134 and nut assembly 135 that connects to the output rod 120. Actuator system 100 may also include additional components such as a resolver or encoder 136 and one or more bearings 138; e.g., as described in U.S. Publication No. 2019/0048988 A1, which is incorporated by reference, and as otherwise known in the art.

An internal power generator system (or generator) 140 can be disposed within the actuator housing 110, for example on, in or adjacent the rotor 132 and stator assembly 133. The generator 140 is connected to a controller or monitor circuit 150 with electronic components including a processor (or microprocessor) 152, an optical coupler, isolator or similar receiver 153 and memory 154 provided on one or more respective circuit boards or modules 155, and a substrate 155S (e.g., formed of a non-electrically conductive barrier material with an inlay configured for near-field communication, or other wireless antenna device), disposed in a recess, pocket, cutout or cavity 160 formed in, on or into the outside surface of the actuator housing 110. A signal encoder or decoder 156 can also be provided, along with an input/output (I/O) communication interface 157.

A cover 165 can be provided to seal the recess 160 (FIG. 1), protecting the controller 150 from accidental contact and environmental contamination. The cover 165 can be formed of an RF-transparent material, for example plastic or polymer, to facilitate wireless communications between controller 150 and a computing device 180. The cover 165 can be made flush with the actuator housing 110, or extend from the housing 110, or be recessed into the housing 110.

A data bus or signal wires 170 can connect the controller 150 to the internal power generator 140. Additional bus lines or wires 170 can also provide data from one or more internal sensors such as thermal sensors T (e.g., adjacent a bearing component 138 or the shaft and nut assembly 134, 135), vibrational sensors V (e.g., adjacent the shaft and nut assembly 134, 135, or other load-bearing mechanical component), one or load sensors L (e.g., adjacent the output rod 120 or fixture 125), and/or one or more load-bearing, moisture, humidity, or other sensors H.

As shown in FIG. 1, one possible implementation is in an actuator 100 where the controller 150 has processor and memory electronics disposed on one or more circuit boards 155, mounted to the outside of the actuator housing 110 in a small recess, pocket, cutout or cavity 160. Recess 160 can be configured to closely fit the circuit board or boards 155 (or other electronic components) making up the controller 150, reducing size requirements.

As shown in FIG. 2A, a signal bus or signal wires 170 connect the power generator 140 (and various sensors T, V, H, etc.) to the controller 150. Depending on application, the bus or wires 170 can be fed through the actuator housing 110 via one or more connectors 175, e.g., on the inside of the recess 160, connecting with one or more circuit boards 155 of the controller 150.

The controller 150 can be disposed in the recess or cavity 160, as shown in FIG. 1, and hidden under a protective plastic, polymer, or metal cover or overlay 165. For example, cover 165 can be provided in durable, elastic form applied to the exterior of the actuator housing 110 with an adhesive (e.g., with a self-adhesive cover 165, similar to a sticker), or cover 165 can be attached to actuator housing 110 via one more screws, bolts, clips, or similar mechanical attachments.

The controller 150 can be configured to operate in a passive manner; that is, counting the number of revolutions, cycles or direction changes of the motor assembly 130 when the actuator 100 is operational (e.g., when the motor 130 is running), or when the motor 130 is operating at or above a preselected speed (e.g., a minimum rotational speed). The data generated by controller 150 can be stored in memory 154 and accessed either when actuator 100 is operational (e.g., with external power on and motor 130 running) or when the actuator 100 is not in operation (e.g., with the external power either on or off, and motor 130 not running). The data can thus be accessed either when actuator 100 is moving (with output rod 120 in linear motion responsive to the rotation of motor 130), or not moving (with output rod 120 and motor 130 stationary).

The processor and memory electronics 152 and 154 of controller 150 need not be powered to access the data stored in memory 154. Rather, an operator could communicate with ("tap into") the data using a computing device 180 configured for near-field communication (NFC), or other wireless communication with controller 150. Suitable wireless computing devices 180 include smart phones, tablet computers, and other personal or mobile computing devices, and dedicated wireless communications devices 180, for example a dedicated computer or hub device 180 connected to a data center 185.

A wireless input/output (I/O) interface 157 can be provided on one or more of the electronic circuit boards or modules 155, and configured to transfer data from microprocessor 152 and memory 154 to the computing device 180. Power for operation of the controller 150 can be generated from the signals from the generator 140, using a rectifier and regulator circuit 158 to condition a standard DC power supply, which can be conditioned and/or stored in a capacitive or battery-based power condition and storage circuit 159.

In operation, controller 150 receives signals from the power generator system 140; e.g., as a series of voltage or current pulses over signal wires 170. A portion of the energy is converted to power for operation of the microprocessor 150, memory 154, and other components such as interface 157, for example using a rectifier/regulator circuit 158. A portion of the energy can be stored in a battery or capacitive storage circuit 159, for operation of controller 150 when the motor 130 is not operating, and wires 170 do not provide signals.

Controller 150 can also count the signals from the generator 140, in order to determine the number of motor rotations or cycles. The magnitude and polarity of the signals can be used to determine the rotational direction and power output, from which the position of and loading on the output rod 120 can be determined. Once the controller electronics are in place and powered, the microprocessor 152 can also execute code to determine additional operational parameters such as temperature, moisture level, and vibrational state, for example using data from temperature, humidity, and vibrational sensors in a sensor array 145. Similar sensors may be disposed on one of the circuit boards 155 of microprocessor 150.

The data generated by microprocessor 152 can be stored in memory 154, communicated directly to computing device 180, or both. Communications with device 180 can be performed via BLE, LoRa or other lo-range, mid-range or long-range, low-power RF wireless communication system, or other wired or wireless communication standard, as described herein, or as known in the art.

Suitable computing devices 180 can be provided to the operator of the actuator system 100, or to the manufacturer or maintenance personnel, in any combination, inclusive or exclusive. Another configuration would include a central dedicated computer or "hub" device 180, within communication range of one or more actuator systems or devices 100 with supported controllers 150, and connected to a data center 185; e.g. via the internet or a cloud connection.

In these configurations, individual controllers 150 on each actuator 100 can maintain constant or synchronous communication with computing device 180 and data center 185 while the respective actuators 100 are running. When actuators 100 are not running, the respective controllers 150 do not necessarily send updates to the device 180, and the data center 185 may display the most recent data, as it was last received. Alternatively, controllers 150 can perform intermittent or asynchronous communications with hub 180 during actuator down time, or a combination of synchronous and asynchronous communications.

FIG. 2B is a hybrid process flow and system chart 200 illustrating how signals generated by the power generator system 140 (step 210) can be converted into operational data and other information by a suitable controller. As shown in FIG. 2, the generator 140 generates current or voltage pulses based on motor operation. One or more sensor signals can also be provided to the controller 150, such as temperature, humidity, or vibrational state sensed at or proximate any of the internal actuator system components. These signals can be transmitted over wires 170 to an electronic-based controller 150 with one or more circuit boards 155, or via a wireless connection, or a combination thereof (e.g., with hard-wired signals for power delivery and motor cycle counts, and wireless sensor signals).

Controller 150 includes a power generation circuit 158 with a rectifier and regulator or similar components configured to generate power (step 220) from the voltage or current pulses transmitted along wires 170. The power can be provided in a standardized DC format, suitable for operation of the microprocessor 152, the optical coupler/isolator or receiver 153, memory 154, interface 157, and other electronic components on circuit board (or boards) 155. The power can also be filtered and conditioned and/or stored (step 230) in capacitive array or battery circuit 159, for operation of controller 150 when wires 170 do not necessarily carry signals.

Controller 150 also includes a signal processing circuit with one or more signal receivers such as an optical coupler or optical isolator 153, configured to receive and isolate the current or voltage pulses and sensor signals (step 240), reducing ground loops, noise and cross-talk for improved signal processing. Control signals can be generated (step 250) from the output of the optical coupler/isolator 153; e.g., using a digital signal encoder or decoder 156, for data processing (step 260) by the microprocessor 152. The processed data can be stored in memory 154 (step 270), and communicated via a wireless or wired I/O interface 157 (step 280), as described herein.

The signals from the generator assembly 140 (step 210), when passed through controller electronics including the rectifier and regulator 158 (step 220), can be converted to via a DC power conditioner/storage circuit 159 (step 230), for operation of the processor 152, receiver 153, memory 154, decoder 156, I/O interface 157, and other electronic components 152 of the controller 150, disposed on circuit board 155.

The signals from the generator 140, when passed through a suitable receiver such as an optical coupler or isolator 153 (step 240), can be configured to present as two digital square wave pulse signals, where the pulses are phase shifted from one another other. This signal configuration allows the signal encoder/decoder 156 (step 250) and processor 152 to process the signal data (step 260) to determine the direction in which the actuator is running, and to maintain a direction state (e.g., as a binary value) in memory.

The motor direction state can be stored in memory 154 (step 270), and accessed to determine whether a direction change has occurred, and to increment a corresponding direction reversal count (e.g., indicating a motor cycle phase has been completed in the proximal or distal direction, so that two reversals can indicate a complete cycle, with the thrust rod moving once in each direction). These data can then be communicated to an external computing device (step 280), for example using a wireless I/O interface 157.

Figure 3:
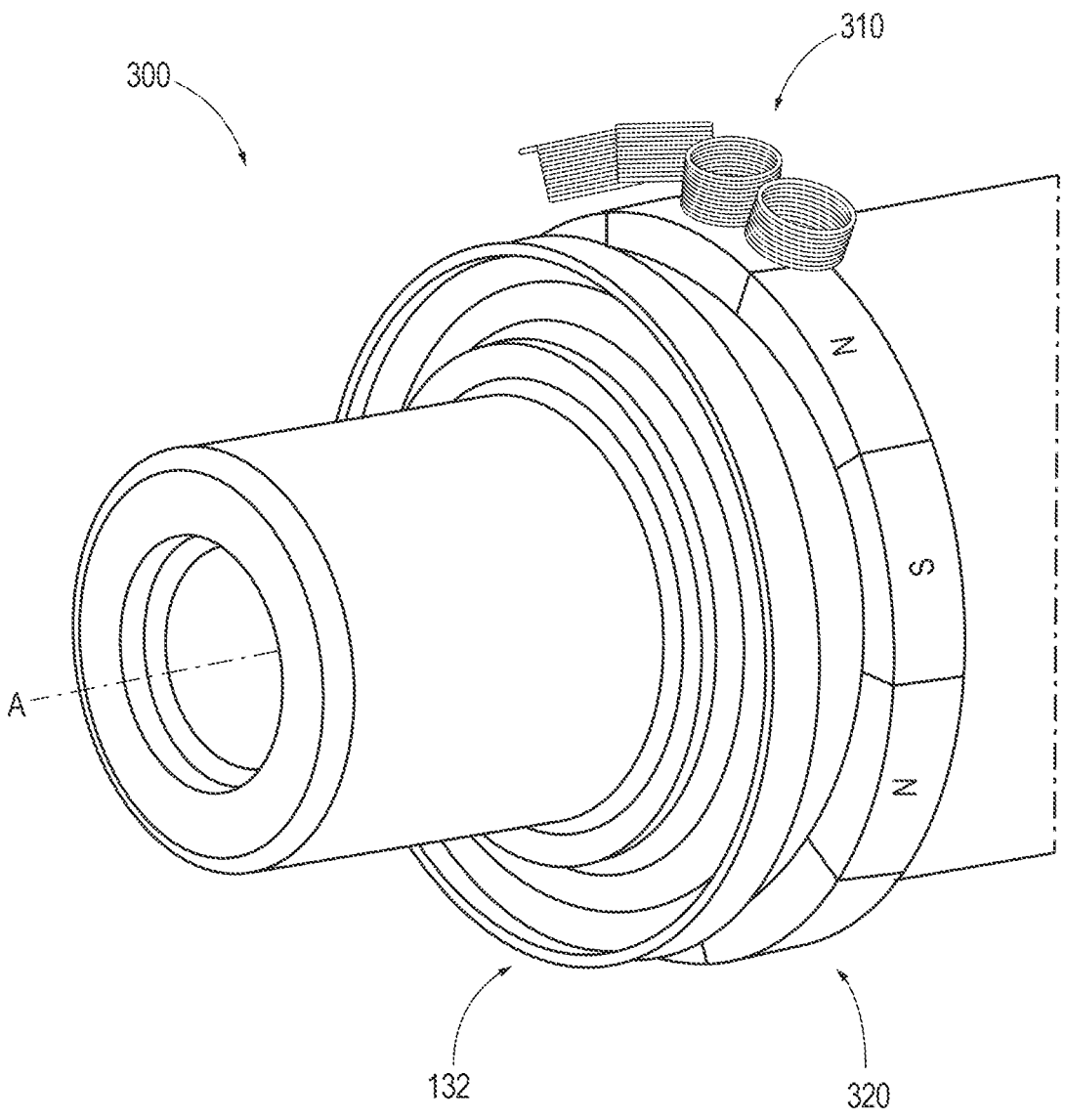
FIG. 3 is a schematic diagram illustrating a first exemplary generator design for the integrated motor actuator of FIG. 1, with coils disposed about the rotor.

FIG. 3 is a schematic diagram illustrating a first representative generator assembly 300 for the internal power generator system 140 in an integrated motor actuator, as described herein. As shown in FIG. 3, generator assembly (or generator) 300 includes a number of inductive coils 310, Hall sensors or similar electromagnetic pickups, which can be mounted on the inside of the actuator housing, adjacent a number of corresponding magnetic poles 320 distributed about the end circumference of rotor 132, and configured to sense the induced voltage or electromotive force (emf) induced by the passage of poles 320. For example, coils 310 can be provided in the form of N conductive wire windings, where the voltage generated by each coil 310 is proportional to N, and the rate of change of magnetic field (or magnetic flux) through the area defined by the circumference of the coil.

Figure 5:
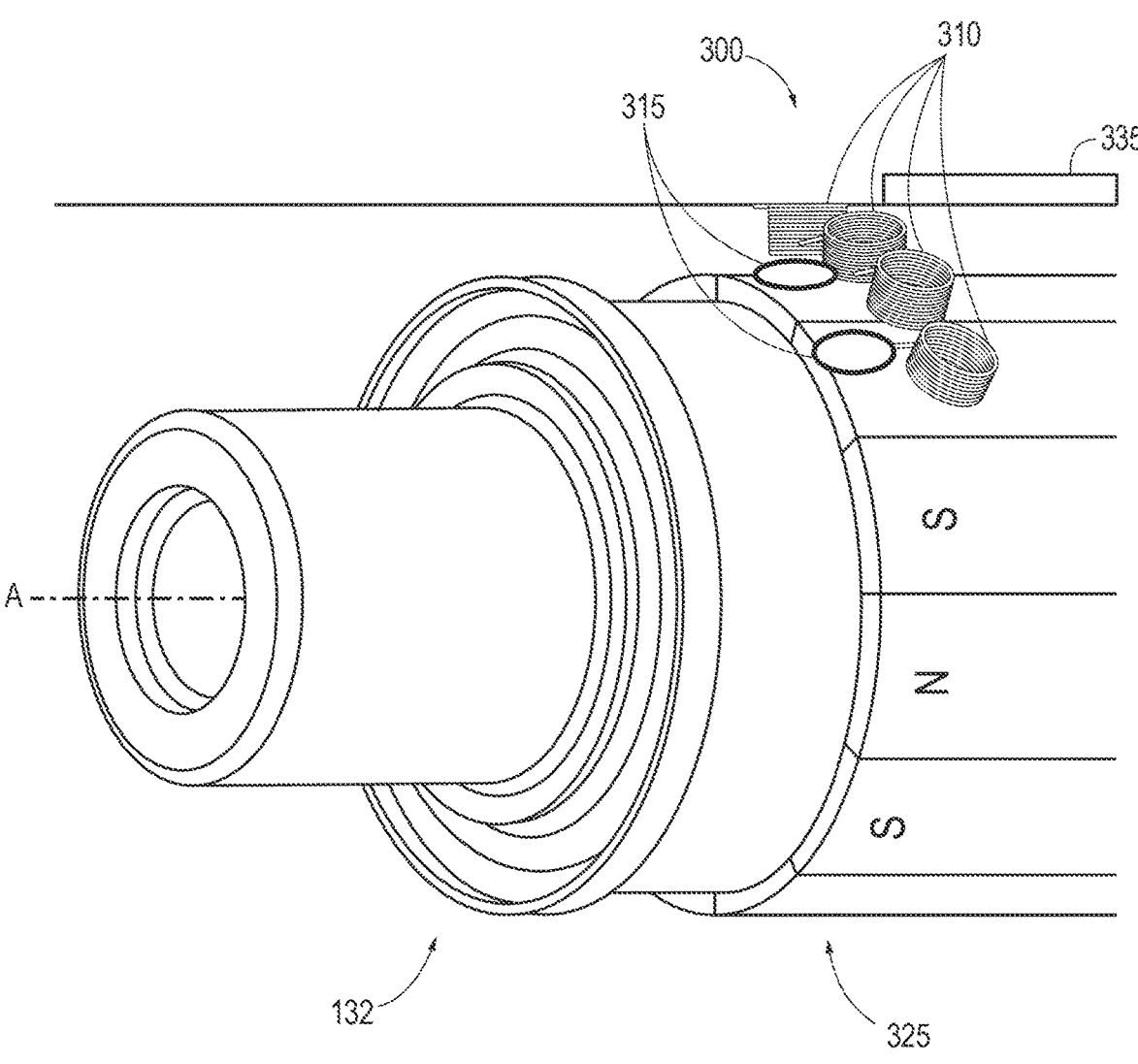
FIG. 5 illustrates a third exemplary generator design, with coils disposed adjacent the end stator winding turns.

The generator coils 310 can be directly or indirectly mounted to the inside of the actuator housing, before or after installation of the stator windings, and need not be buried or embedded in potting compound, or other insulating material. Magnetic poles 320 can be disposed about the rotor to interact with these coils 310; e.g., in the form of individually placed permanent magnetic poles 320 with alternating N/S orientation, or in the form of a magnetic strip having alternating N/S poles 320. Alternatively, the coils 310 can be placed adjacent the existing poles 325 on the rotor 132; e.g., in a surface-mounted permanent magnet (SPM) arrangement, as shown in FIG. 5 (below).

When rotor 132 rotates (e.g., about longitudinal axis A), the coils 310 of generator assembly 300 should produce a voltage or current pulse suitable for the requirements of the power generation electronics; e.g., so that the pulses can be voltage rectified, filtered and regulated to supply power for the controller processor and memory. The generator assembly 300 can have any suitable number of coils and associated phases, for example two, three, or more, as adapted for conditioning via an optical coupler/isolator or similar receiving device to be encoded as a quadrature signal. In contrast to prior art method, the same voltage or current pulses generated by coils 310 can be used both for powering the controller circuit, and also to provide the signal information used to calculate motor cycles or rotations of the rotor 132.

To provide suitable signal quality and resolution, the generator assembly 300 should be designed so that the number of magnetic poles 320 is sufficiently high, such that multiple signal pulses are obtained for each mechanical revolution of the rotor 132. This embodiment does not rely on the motor's existing magnets, which interact with stator windings to drive the rotor into rotation about its axis. The design should also take into consideration potential cogging torque and drag contributed to operation of the motor system, so that any such additional contributions can be reduced, minimized, or made small or negligible, as compared to the typical actuator power output.

One approach to a suitable generator design, while managing costs, is to place coils 310 at selected locations extending partly around rotor 132 (and the interior of the actuator housing), space appropriately from magnetic poles 320 to provide good signal strength, while maintaining rotational clearance. The poles 320 can be spaced about the entire rotor circumference, as shown in FIG. 3. In this configuration, the signals are fully intact at all times (that is, each coil 310 generates the same number of signals, uniformly and sequentially with respect to rotation of the rotor 132), but a complete set (full circle) of coils 310 is not necessarily required, reducing costs.

Figure 4:
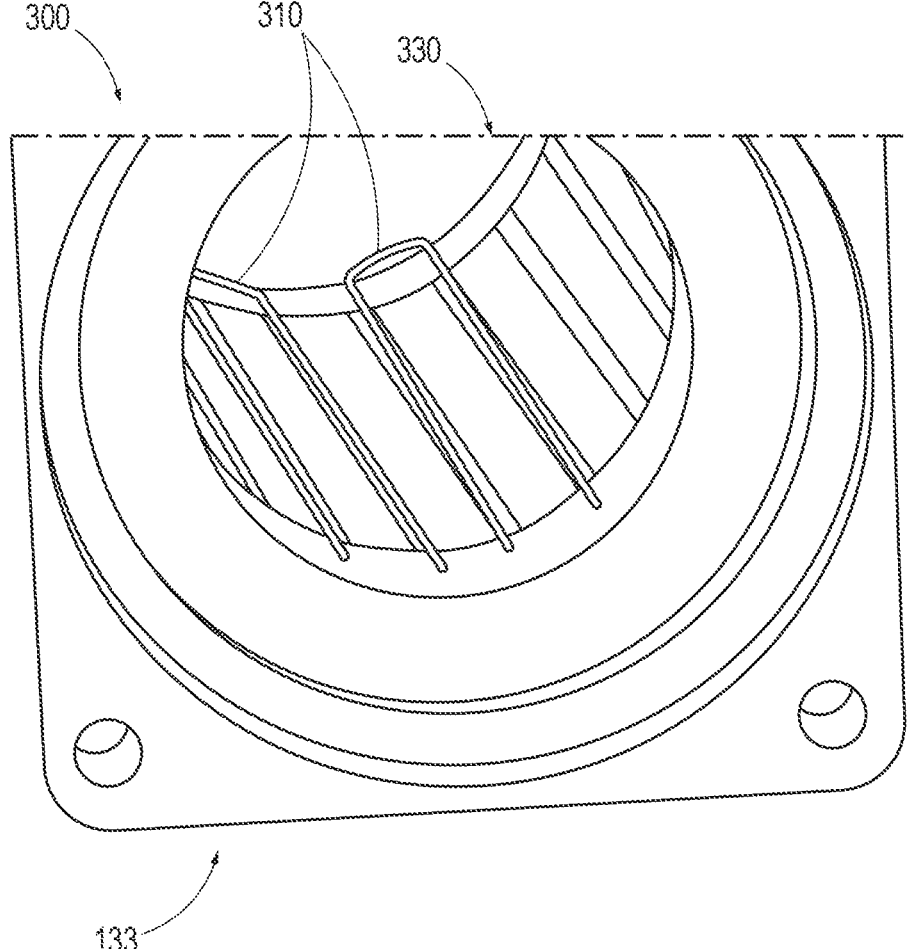
FIG. 4 illustrates a second exemplary generator design, with coils disposed about the stator teeth.

FIG. 4 illustrates a second representative design for generator assembly (or generator) 300. In this example, longitudinally extended wire coils 310 are installed around one, two, or more stator teeth 330 on an existing stator assembly 133. The coils 310 are configured to pick up signals from the existing rotor magnets, which are used to drive the rotor into rotation. These coils 310 may also be sensitive to flux generated by the stator teeth 330, crossing the gap to the adjacent (rotating) rotor poles.

As used herein, coils 310 may also be provided in the form of Hall sensors, solid-state pickups, or other electromagnetic devices sensitive to changing magnetic flux, and all of these meanings are encompassed.

FIG. 5 illustrates a third representative design for generator assembly (or generator) 300. In this example, a number of small, generally circular wire coils 310 can be installed prior to potting; e.g., at or adjacent the end turns of stator windings 335, and configured to pick up flux from the existing rotor poles 325 provided to drive the rotor 132, and/or magnetic flux generated by stator elements including stator windings 335 and/or stator teeth 330 (see FIG. 4).

In this configuration, the coils 310 may occupy a relatively small or modest, but otherwise unused space inside the actuator housing, adjacent the end turns of the stator windings 335. Coils 310 can thus generate emf based not only on the passage of magnetic poles 325 (or rotor poles 320; see FIGS. 3, 8, 9), but also from an inductive coupling to stator elements such as the stator teeth 330 and stator windings 335 (see also, e.g., FIGS. 4, 10).

While the flux generated by magnetic poles 320 (or rotor poles 325) varies based on rotational speed, the flux generated by the stator windings varies based on motor current. As a result, the amplitude of the voltage or current pulses generated by coils 310 can also be used to determine power delivered to the rotor 132, which can in turn be used to determine loading on the output rod. One or more suitable coils 310 can also be inductively coupled to the motor current supply itself (e.g., looped about the motor current conductor), in order to generate power for operation of the controller electronics, with (or without) additional coils 310 configured to sense the passage of generator poles 320 (or rotor poles 325).

Figure 8:
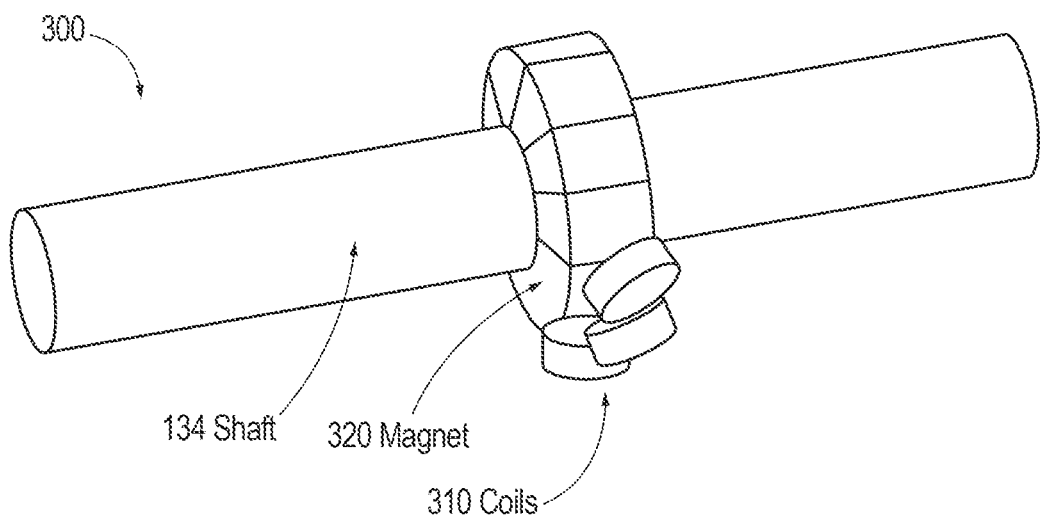
FIG. 8 illustrates a sixth exemplary generator design, in a shaft-mounted configuration.
Figure 9:
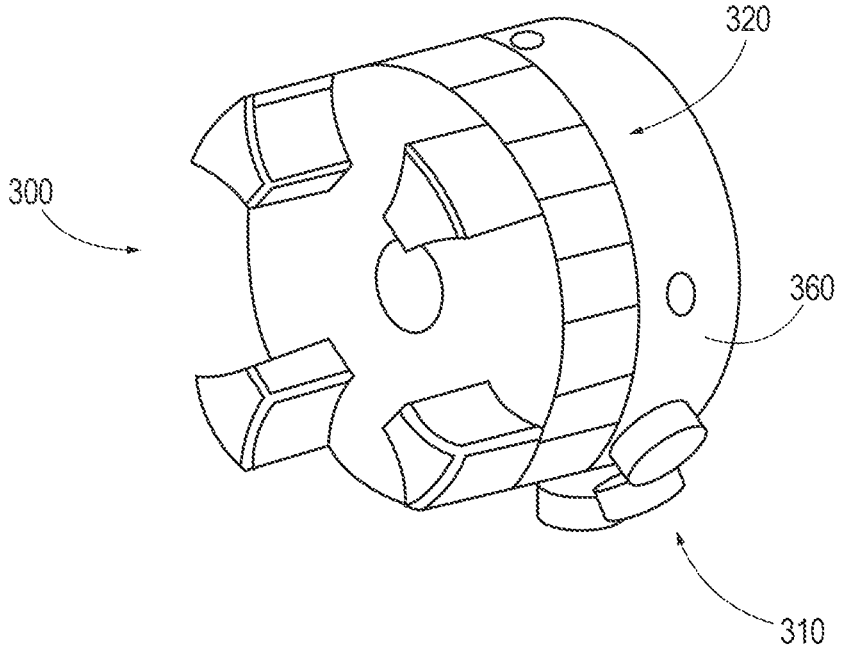
FIG. 9 illustrates a seventh exemplary generator design, integrated with a rotary coupling.
Figure 10:
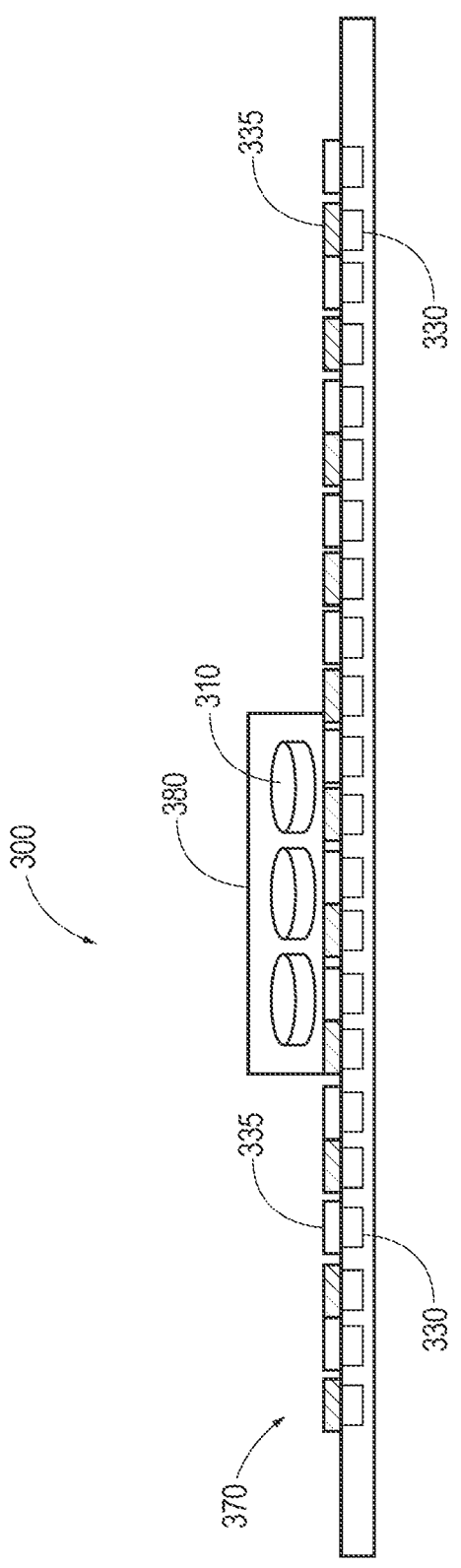
FIG. 10 illustrates an eighth exemplary generator design, applicable to linear motor systems.

Coils 310 are also not necessarily the sole source of motor cycle information for generator 300. A number of Hall sensors 315 (or other dedicated pickups) can also be provided; e.g., one, two, three or more sensors 315, and configured to sense the passage of magnetic poles 325 on the rotor 132, as shown in FIG. 5. In these examples, the coils 310 can be adapted for generating current to power the controller electronics (or other electronics), and the sensors 315 can be configured to generate the signals used to determine the direction and number of rotations of the rotor 132 (and/or the number of motor direction changes, and motor cycles). Sensors 315 can also be configured to sense the induced voltage or emf generated by the passage of magnetic poles 320 disposed on a rotor 132, shaft 134, or rotary coupling 360 (e.g., as shown in FIGS. 3, 8 and 9), or by stator elements such as stator teeth 330 or stator windings 335 (e.g., as shown in FIGS. 4 and 10).

Figure 6:
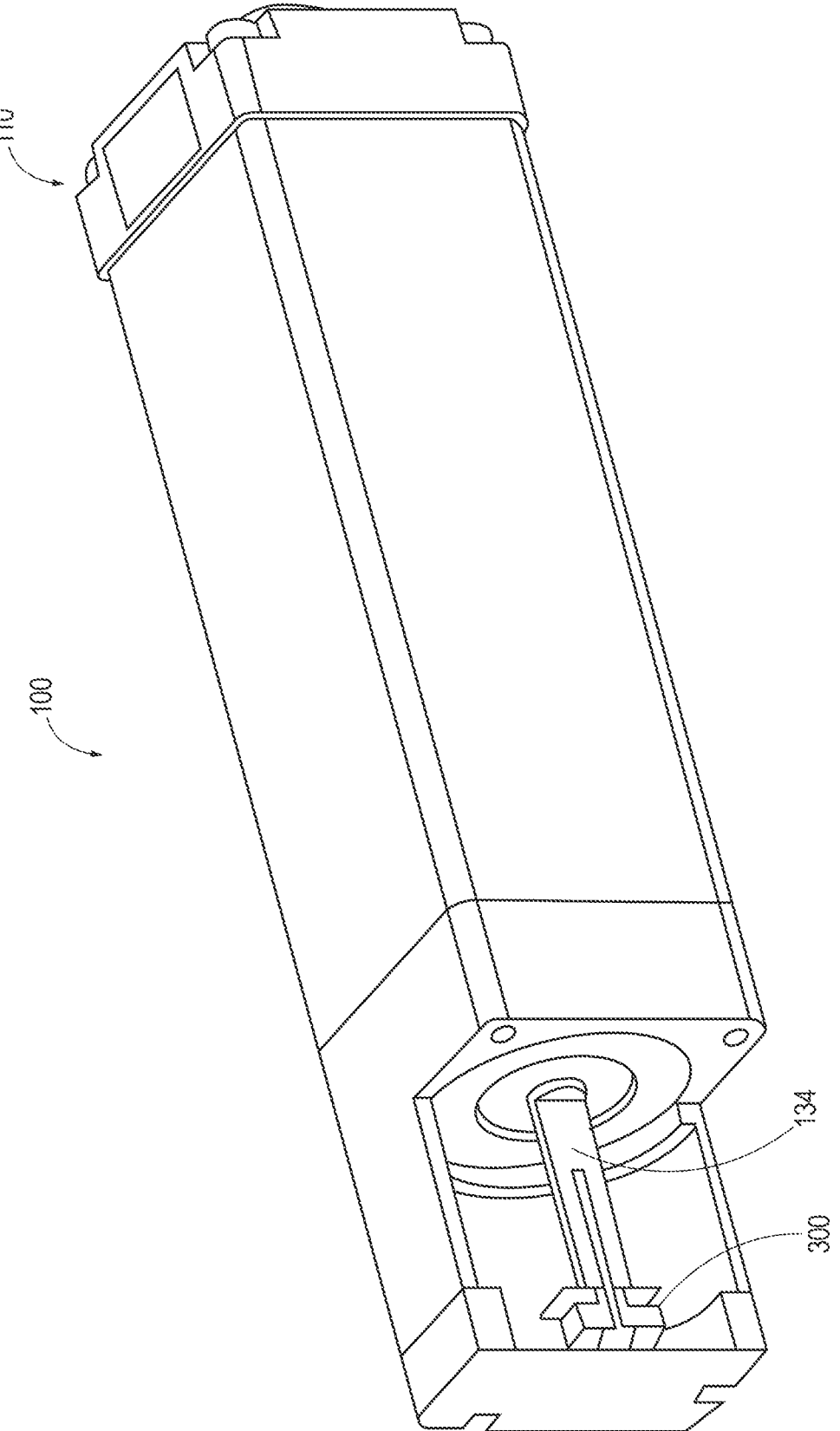
FIG. 6 is a cutaway view of an integrated motor actuator system, illustrating a fourth exemplary generator design, disposed at the end of the screw shaft.

FIG. 6 is a cutaway view of an integrated motor actuator system 100, illustrating a fourth representative design for generator assembly (or generator) 300. In this end-mounted example, an integrated (e.g., commercially available or off-the-shelf) generator device 300 can provide a number of coils or pickups adapted for mounting adjacent a corresponding set of alternating magnetic poles 320 on the end of the screw shaft 134. In this example, generator 300 can be used in addition to, or in place of, a traditional encoder or resolver, and in designs where the shaft end is exposed. Generator assembly 300 can also be adapted for other configurations of rotating shaft 134.

Figure 7:
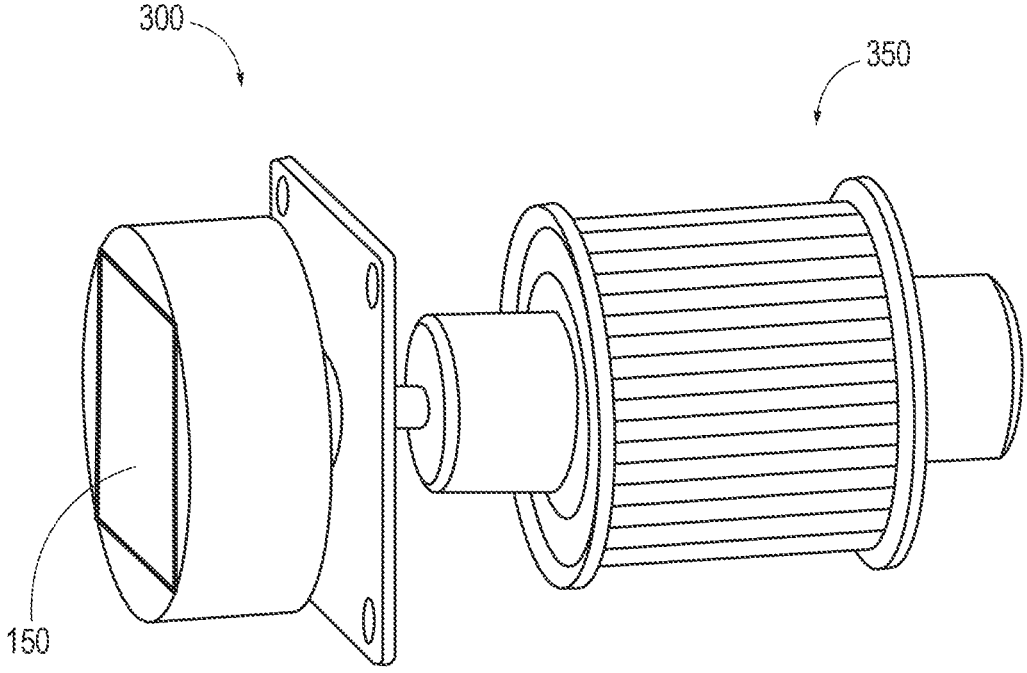
FIG. 7 illustrates a fifth exemplary generator design, with a pulley assembly, and integrated microcontroller.

FIG. 7 illustrates a fifth representative design for generator assembly (generator) 300. In this configuration, an integrated generator device 300 can include a number of coils or pickups adapted for mounting adjacent a corresponding set of alternative poles coupled to a pulley 350. The pulley 350 can be provided, for example, at the idle end or drive end of a belt-driven liner actuator system, and in other belt-driven systems, as known in the art.

In an alternative version of the fifth representative generator assembly (generator) 300, an integrated controller 150 is disposed in, on or adjacent to the integrated generator device 300; e.g., with direct wired couplings between the controller 150 and generator 300, as described herein. This configuration obviates the need for a separate, external mounting arrangement for the controller 150, which can instead be disposed inside the motor or actuator housing, adjacent the pulley 350. A suitable RF-transparent window may be provided in the adjacent housing surface, to facilitate wireless communications between controller 150 and an external computing device.

The generator assembly 300 of FIG. 7 can also be adapted for other configurations of the pulley (or pulley assembly) 150. These include, but are not limited to, high-speed belt-drive actuator systems with a transverse motor mount; e.g., according to U.S. Publication No. 2018/0045284 A1, which is incorporated by reference herein, in the entirety and for all purposes.

A suitable pulley assembly 350 with integrated generator 300 and controller 150 could also be deployed in a traditional rod-style linear actuator with a reverse-parallel or transverse motor configuration; e.g., with the motor disposed in a separate motor housing mounted to the actuator, and using a belt, chain, shaft or gearing system to couple the motor to the actuator shaft. More generally, the shaft can also be rotationally fixed, with the motor configured to rotate the nut about the shaft.

FIG. 8 illustrates a sixth representative design for generator assembly (generator) 300. In this example, generator assembly 300 is shaft-mounted, with a set of coils 310 disposed adjacent a corresponding set of alternating magnetic poles 320, which are disposed about the circumference of the shaft 324. The poles 320 can be formed of individual magnets with alternating magnetic poles 320, disposed sequentially around the shaft 312, as a magnetic strip or ring magnet with alternating poles 320, or as a ring-shaped magnetic element with diametrically opposed poles 320. This configuration can be used in an integrated motor actuator, or in a reverse parallel-mount actuator or transverse motor mount system.

FIG. 9 illustrates a seventh representative design for generator assembly (generator) 300. In his example, generator assembly 300 includes a number of coils 310 disposed adjacent a set of alternating poles 320 that are distributed about the circumference of a rotary coupler (or coupling) 360. In this example, generator assembly 300 can be used in an end-mounted motor actuator system, where the motor is coupled to a shaft via coupling 360, or in a range of other actuator systems, using such a motor coupling 360.

FIG. 10 illustrates an eighth representative design for generator assembly (generator) 300, applicable to linear motor designs. In this example, generator assembly 300 includes a number of coils 310 disposed adjacent a linear stator assembly 370, with a number of stator elements comprising stator windings 335 and/or stator teeth 330 distributed longitudinally along the stator assembly 370.

As shown in FIG. 10, stator windings 335 can be energized to provide alternating (e.g., N/S) magnetic polarities, in order to drive a "rotor" or mover 380 (e.g., with fixed magnetic poles) along the linear stator assembly 370. Pickups or coils 310 can be adapted to generate voltage or current pulses as the mover 380 passes over the alternating stator windings 335, as described herein. In this configuration, generator 300 can be used in a purely linear motor design, for example in a linear slide actuator system.

Prognostic and Diagnostic Modes

The controller can also be used to provide diagnostic indicators, based on the sensor data. An analytical model of the actuator system can be provided, to define normal operating modes and potential failure modes of the system.

In various examples and embodiments, the linear motor actuator system can include a motor configured to drive a screw shaft and nut assembly into relative rotation about a longitudinal axis of the actuator system, and a thrust rod coupled to the nut assembly. The thrust rod can be configured to execute reciprocal motion along the axis, in response to the relative rotation.

One or more sensors can be configured to acquire sensor data characterizing operational conditions of the motor actuator system. The operational conditions can include, for example, the position of the thrust rod along the axis, motor current delivered to the motor, and/or component temperatures of various elements in the motor actuator system. Memory can be provided for storing cycle counts derived from the position, as well as representative temperature data for the components.

A processor can be configured to generate a status indicator based on analysis of operational conditions characterized by the sensor data, with respect to the model. The processor an also be configured to determine the travel distance of the thrust rod based on the position, and to determine work done by the actuator system based on the travel distance and the motor current delivered to the motor. The status indicator can be representative of wear on a component of the motor actuator system, based on the travel distance and the work done.

An interface can be configured to communicate the status indicator to a control device; e.g., where the status indicator is further representative of the component temperature in relation to at least one normal operating mode of the actuator system, and/or predictive of component failure based on the component temperature in relation to at least one of the failure modes.

The communication can also include the number of cycles the actuator has made in its working lifespan, as well as other data that informs on the overall health condition of the actuator system. A generator can be provided, which produces electrical power and signals for the processor, memory, and related electronics, based on electromagnetic induction from operation of the actuator motor; e.g., without other external power supply.

The processor can be configured to estimate one or more of: the total number of cycles based on counting the number of motor rotations, the total number of cycles based on counting the number or motor rotation direction changes, the temperature range for specific components, at which one or more of the motor rotation direction changes happen, and a status indicator that contains data on the conditions in which the system has been operated, and/or preventative mainte- nance that may indicated, due, or past due.

Applications

A method of actuator operation comprises operating in a passive nature (e.g., without external power requirements), one or more sensors configured to acquire sensor data characterizing operational conditions of a motor actuator system. The operational conditions can include a position of a thrust rod along an axis, and a component temperatures of the motor actuator system.

Memory can be configured for storing cycle counts of the motor actuator, as well as representative temperature data for the components. A processor ca be configured such that the processor does not need external or otherwise dedicated power provided from outside the actuator, in order to operate to determine the operational conditions and a status indicator indicative of a health status of the actuator system; e.g., based on the cycle counts and component temperatures.

An interface can be configured to communicate the status indicator and cycle counts to a control device configured for operating the motor actuator system; e.g., where the status indicator is further representative of the component tem- perature in relation to at least one normal operating modes of the actuator system, and/or predictive of component failure based on the component temperature in relation to at least one failure mode of the actuator system.

The interface can communicate the status indicator, cycle counts and component temperatures with a device controlled by an operator, for example via wireless communication to a mobile computing device. The communication can includes the number of cycles the actuator has made in a working lifespan, or other time window, as well as other data that informs on the overall health condition of the actuator system.

A generator can be configured to produce power and cycle count signals for operation of the memory and processor electronics upon operation of the actuator motor, based on inductive pickup, without external power, or other dedicated power supply. Thus, the electronics do not require dedicated external power to be connected to the actuator for the purpose of powering the processor, or to trigger the com- munication.

The electronics does not require internal batteries, capaci- tors or other storage components to store externally gener- ated power for later use. The electronics may include internal batteries, capacitors or other storage components to store energy provided by the generator, based on inductive energy pickup from rotation of the motor.

The power required by the processor and memory elec- tronics to compute the cycle count can be provided via the signals from the generator. The generator may only provide the signals when a changing magnetic field is presented by operation of the actuator motor, for example through induc- tive pickup in a number of coils disposed adjacent alternat- ing magnetic poles on the rotor.

The signals from the generator, when passed through electronics including a rectifier and regulator, can be con- verted to a DC power standard for supply of power to the processor and memory.

The signals from the generator, when passed through an optical coupler or other suitable receiver, can be configured to present at a controller including the processor and memory electronics as two digital square wave signals, where the pulses are phase shifted from one another other. This signal configuration allows the processor of the con- troller to determine in which direction the actuator is run- ning, and to maintain a direction state binary value in memory.

The direction state can be accessed when determining the direction, to determine whether a direction change has occurred, and a direction reversal count can be incremented.

In any of these examples and embodiments, the actuator system can include an internal, passive generator configured for both electrical power and motor cycle signal generation. The generator can include a number of wire coils or other inductive pickups; e.g. wire coils wrapped N times, and connected to a controller with processor and memory elec- tronics via a rectifier and regulator, and an optical coupler.

The coils can be installed in a position that will experience a changing magnetic field or flux passing through the coils, when the actuator motor is operated. The change in magnetic field or flux can be generated by the existing drive magnets on the rotor, provided for the purpose of motor operation, or from a magnetic strip or individually placed magnets with alternating poles specifically adapted for the purpose of creating a changing magnetic field for the coils. Voltage produced by the coils is proportional to N, the number of times the coils is wrapped.

The coils can be mounted on the inside of the actuator housing, after potting (that is, not embedded or buried in potting material). Magnets can be added to the rotor to interact with these coils; e.g., in the form of individually placed magnets, or as a magnetic strip defining alternating magnetic poles, which is wrapped around the rotor. This embodiment does not rely on the motor's existing magnets, which interact with stator windings to drive the rotor into rotation about its axis.

The coils or pickups can be formed of wires installed or wrapped around one or two stator teeth of the existing stator windings, and adapted to pick up the changing magnetic field produced by the existing rotor magnets. One or more coils can also be disposed about or adjacent a current supply conductor for the motor, and inductively coupled thereto.

Small coils of wire or similar pickups can be placed adjacent the end turns of the motor windings, and adapted to pick up the changing magnetic field (or flux) produced by the stator windings. In this configuration the coils may occupy a relatively small or modest, but otherwise unused space inside the actuator housing. Hall sensors or other pickups can also be used to sense an induced emf based on the changing magnetic field (or flux).

An end mounted version of the generator can also be provided. This configuration can be provided off-the-shelf, or specially adapted to couple to the end of the rotating shaft. This configuration could be applied to actuator designs that have an exposed shaft end.

The generator can also be integrated into a pulley. The pulley could be provided at the idle end of a belt drive actuator, or in any belt driven actuator system.

The generator can be provide in a shaft mounted design. The shaft mounted design comprises alternating magnetic poles arranged around a shaft; e.g., either individually placed magnets with alternating orientation or a magnetic strip or diametrically magnetized ring shaped magnet, concentric to the shaft. The generator design could also be integral to a rotary coupler, and used on any linear actuator that is coupled to a motor with such a component.

The generator design can also be flat or linear, with alternating magnetic poles disposed in a line arrangement, passing by a set of coils. This configuration could be installed on a linear motor, or a linear slide actuator.

The number of electrical poles of the generator can be sufficiently high to prevent voltage drop when the motor is running at a relatively slow speed, and provide a good resolution for determining rotation direction and cycle count. The number of generator phases can typically be at minimum of two but the controller could also be adapted to handle three or more phases.

EXAMPLES

Example 1 is a motor actuator system with one or more of:
(a) a motor configured to drive a screw shaft and nut assembly into relative rotation about an axis;
(b) a thrust rod coupled to the nut assembly, the thrust rod configured to execute reciprocal motion along the axis in response to the relative rotation;
(c) one or more sensors configured to acquire sensor data characterizing operational conditions of the motor actuator system, where the operational conditions include one or more of a position of the thrust rod along the axis, a motor current delivered to the motor, and one or more component temperatures of one or more components of the motor actuator system;
(d) memory configured for storing cycle counts of the motor as well as representative temperature data for the component temperatures;
(e) a processor configured to generate a status indicator based on analysis of the operational conditions characterized by the sensor data with respect to model data characterizing one or more normal operating modes and one or more failure modes for the motor actuator system, where the processor is further configured to determine a travel distance of the thrust rod based on the position and to determine work done by the motor actuator system based on the travel distance and a motor current delivered to the motor, where the status indicator is representative of wear on one or more of the components of the motor actuator system based on the travel distance and the work done; and
(f) an interface configured to communicate the status indicator to a control device, where the status indicator is further representative of one or more of the component temperatures in relation to at least one of the normal operating modes, and predictive of component failure based on the one or more component temperatures in relation to at least one of the failure modes;
where (g) the interface can be further configured to communicate a number of cycles the motor actuator system has made in an operational period or working lifespan based on the cycle counts, as well as other data including information on an overall operating condition of the motor actuator system and/or one or more of the components thereof; and
(h) a generator that produces electrical power and signals for electronics including the processor and memory.

Example 2 follows the system of Example 1, where the processor is adapted to estimate one or more of:
(a) a total of the number of the cycles by way of counting the a number of rotations of the motor;
(b) a total of the number of the cycles by way of counting the a number of direction changes of rotation of the motor;
(c) a temperature or temperature range at which one or more of said direction changes happened; and
(d) the status indicator, where the status indicator contains data on the operational conditions in which the motor actuator system has been operated, and/or data on preventative maintenance that is due or past due based on the operational data.

Example 3 is a method including one or more of:
(a) one or more sensors being configured to acquire sensor data characterizing operational conditions of a motor actuator system, where the operational conditions include a position of a thrust rod along an axis, and a component temperature of a component of the motor actuator system;
(b) memory being configured for storing cycle counts as well as representative temperature data for the component;
(c) a processor operating such that the processor does not need dedicated power provided to it from outside the actuator;
(d) an interface configured for communication of a status indicator and a cycle count to a control device configured for operating the motor actuator system, where the status indicator is representative of the component temperature in relation to at least one normal operating mode of the motor actuator system, and predictive of component failure based on the component temperature in relation to at least one failure mode of the motor actuator system, said communication taking place with a device controlled by an operator of the motor actuator system, where said communication includes a number of cycles the motor actuator system has made in an operational period or working lifespan, as well as other data that informs the operator on an overall operating condition of the motor actuator system and/or the component thereof; and
(e) a generator producing power and signals for electronics including the memory and processor;
where (f) the method is executable having a passive nature, such that no other power source external to the motor actuator system is required for operation of the electronics.

Example 4 follows a method according to Example 3, where:

the electronics do not require dedicated external power to be connected to the motor actuator system for the purpose of powering the processor or to trigger the communication;

and/or the electronics do not require internal batteries to store power for later use.

Example 5 follows a method according to Example 3, where one or more of:

(a) power required by the electronics to compute the cycle count is provided by a generator including coils configured to generate signals for the electronics;

(b) the generator only provides the signals to the electronics when a changing magnetic field is presented through the coils;

(c) the signals, when passed through the electronics including a rectifier and regulator thereof, appear to the processor as a normal DC supply of power, or are converted to a DC power supply for operation of the processor;

(d) the signals from the generator, when passed through an optical coupler or optical isolator, appear to a microcontroller of the electronics as two digital square wave signals, where pulses of the square two digital square wave signals are phase shifted from one other, such that the microcontroller is configured to determine a direction in which the motor actuator system is running and to maintain a direction state binary value in the memory, based on said direction; and (e) the direction state is accessed when determining the direction to determine whether a direction change has happened, and whether a direction reversal count is incrementable based thereon.

Example 6 is a system for a generator design, with:

(a) an electrical power and signal generator, including:

(i) coils of wire wrapped N times and connected to electronics, and (ii) installed in a position that will experience a changing magnetic field passing through the coils;

where (b) the changing magnetic field comes from existing magnets provided for a purpose of motor operation, or (c) from a magnetic strip or individually placed magnets provided for a purpose of creating the changing magnetic field for the coils; and where (d) voltage produced by the coils is proportional to N, N being a number of times said coil is wrapped.

Example 7 is a system according to Example 6 configured according to an embodiment of FIG. 3, and/or including:

a plurality of said coils mounted on an inside of a housing of the system, and not buried or embedded in a potting compound or insulating material, where said magnets are provided on a rotor to interact with said coils in the form of individually placed magnets or a magnetic strip, where this embodiment does not rely on other existing motor magnets for generating said changing magnetic field.

Example 8 is a system according to Example 6 configured as an embodiment of FIG. 4; e.g. including a plurality of said coils or wires installed around one or two more stator teeth of an existing stator winding, configured for picking up on or sensing the changing magnetic field as produced by rotor magnets on a rotor of the system, and/or disposed about or adjacent a motor current supply conductor, and configured for inductive coupling thereto.

Example 9 is a system according to Example 6 configured as an embodiment of FIG. 5; e.g. including a plurality of small instances of said coils or wires and/or Hall sensors placed in, on or adjacent end turns of a motor winding of a stator and configured for picking up on or sensing the changing magnetic field as produced by said end turns of said motor winding of said stator, in a small and otherwise unused space adjacent thereto.

Example 10 is a system according to Example 6 configured as an embodiment of FIG. 6; e.g. including an end mounted version of said generator, including a purchased or commercial off-the shelf or specially made and adapted component configured to be coupled to an end of a rotating shaft of the system, or where said generator is adapted for actuator embodiments of said system that have an exposed shaft end.

Example 11 is a system according to Example 6 configured as an embodiment of FIG. 7; e.g. where the generator is integrated into, onto, or adjacent to a pulley assembly, where the pulley or pulley assembly is disposed at an idle end or drive end of a belt drive actuator or belt driven actuator embodiment of the system.

Example 12 is a system according to Example 6 configured as an embodiment of FIG. 8; e.g. having a shaft mounted design, where the shaft mounted design has alternating magnetic poles arranged around a shaft of the system, said alternating magnetic poles including or being made either individually placed magnets or a magnetic strip, or a diametrically magnetized ring shaped magnet concentric to the shaft.

Example 13 is a system according to Example 6 configured as an embodiment of FIG. 9; e.g. where the generator is integral to a coupler and adaptable to be used on a linear actuator embodiment of the system that is coupled to a motor via said coupler.

Example 14 is a system according to Example 6 configured as an embodiment of FIG. 10; e.g. where the generator has a substantially flat or linear configuration with alternating magnetic poles disposed in or along a line and configure for passing by a plurality of coils adapted to be installed on a linear motor or linear slide embodiment of the system.

Example 15 is a system according to Example 6, where a number of electrical poles of the generator is selected to be sufficiently high to:

(a) prevent substantial voltage drop when the motor is running at a relatively slow or predetermined threshold speed, such that said electronics is operational at said relatively slow or predetermined threshold speed; and/or (b) provide resolution sufficient for said electronics to determine a rotation direction and cycle count for an actuator motor of the system.

Example 16 is a system according to Example 6, where a number of phases of the coils of the generator is at minimum two, or where the system is adapted for three or more such phases.

This disclosure is made with reference to particular examples and embodiments. Changes can be made to and equivalents may be substituted for the disclosed elements without departing from the scope of the invention as claimed. Modifications can also be made to adapt these teachings to different industries, materials, technologies, and technical problems, not limited to the particular examples that are disclosed, and encompassing all the embodiments falling within the language of the claims.

The invention claimed is:

1. A motor system comprising:

a motor having a rotor with a plurality of magnetic poles disposed adjacent a plurality of stator elements, wherein motion of the rotor is responsive to a change in magnetic flux from the plurality of stator elements;

a generator comprising a coil configured to generate an electromagnetic signal responsive to the motion of the rotor, the change in magnetic flux from the plurality of stator elements, or both; and a controller configured to generate power from the electromagnetic signal to operate a processor configured to determine a count of cycles and/or direction changes of the motor based on the electromagnetic signal, and store the count in memory.

2. The motor system of claim 1, wherein the controller comprises a rectifier and regulator collectively configured to convert a portion of the electromagnetic signal to a voltage of the power to operate the processor, and to regulate the voltage to operate the processor.

3. The motor system of claim 2, wherein the controller comprises an energy storage system configured to store the power to operate the processor, absent the electromagnetic signals from the coil.

4. The motor system of claim 2, wherein the controller comprises an optical coupler, isolator, or receiver configured to receive the electromagnetic signal from the coil, in parallel with the rectifier and the regulator.

5. The motor system of claim 4, wherein the controller comprises a signal encoder or decoder coupled to the optical coupler, isolator, or receiver, and wherein the electromagnetic signal from the coil is provided to the signal encoder or decoder as digital pulse sequences or square waves having at least two different phases, generated based on placement of the coil.

6. The motor system of claim 5, wherein the processor is configured to determine the direction changes of the motor based on a shift in the at least two different phases, and to determine the count of cycles based on the direction changes.

7. The motor system of claim 5, wherein the electromagnetic signal from the coil is encoded as a quadrature signal at the signal encoder, and wherein the processor is configured to determine the direction changes from the quadrature signal, and to determine the count of cycles based on the direction changes.

8. The motor system of claim 1, wherein the controller comprises a serial input/output interface or wireless data interface configured to communicate the count of cycles and/or direction changes to a mobile computing device or hub computer.

9. An actuator system comprising:

a housing disposed about a plurality of stator elements;

a rotor having a plurality of magnetic poles disposed adjacent the plurality of stator elements, wherein the rotor is configured for rotation about an axis responsive to a change in magnetic flux generated thereby;

a screw and nut assembly coupled to the rotor, wherein the screw and nut assembly is configured to convert the rotation of the rotor to linear motion of a output rod or output rod;

a plurality of coils and/or pickups configured to generate electromagnetic signals responsive to the rotation of the rotor, the change in flux generated by the plurality of stator elements, or both; and a controller configured to generate power from the electromagnetic signals for operating a processor with memory configured to receive the electromagnetic signals, determine a count of cycles and/or direction changes of the motor based thereon, and store the count in the memory.

10. The actuator system of claim 9, wherein the controller is coupled to an exterior of the housing or disposed within a recess therein, and connected to the plurality of coils and/or pickups via signal wires or a signal bus.

11. The actuator system of claim 10, further comprising a cover disposed over the controller, wherein the cover is formed of an RF (radio-frequency) transparent material configured for wireless communication with the processor.

12. The actuator system of claim 9, wherein the plurality of coils and/or pickups are mounted on an inside of the housing adjacent the rotor, and configured to generate the electromagnetic signals from the plurality of magnetic poles, responsive to the rotation of the rotor.

13. The actuator system of claim 9, further comprising a set of individual or discrete permanent magnets disposed about an end of the rotor with alternating polarity, wherein the plurality of coils and/or the pickups are configured to generate the electromagnetic signals upon the rotation of the rotor, responsive to the alternating polarity.

14. The actuator system of claim 9, wherein the plurality of stator elements comprise stator windings and the coils and/or the pickups are disposed proximate end turns of the stator windings, or inductively coupled to a motor current supply for the stator windings.

* * * * *